United States Patent
Jiang et al.

(10) Patent No.: US 9,143,584 B2
(45) Date of Patent: Sep. 22, 2015

(54) MESSAGE SYNCHRONIZATION METHOD, APPARATUS AND SYSTEM

(75) Inventors: Bing Jiang, Chengdu (CN); Yihua Zhang, Chengdu (CN); Kai Qi, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 907 days.

(21) Appl. No.: 13/361,457

(22) Filed: Jan. 30, 2012

(65) Prior Publication Data

US 2012/0131378 A1    May 24, 2012

Related U.S. Application Data

(63) Continuation of application No. PCT/CN2010/075413, filed on Jul. 23, 2010.

(30) Foreign Application Priority Data

Jul. 30, 2009    (CN) .......................... 2009 1 0089982

(51) Int. Cl.
  *H04L 29/06*    (2006.01)
(52) U.S. Cl.
  CPC ................ *H04L 69/28* (2013.01); *H04L 69/14* (2013.01)
(58) Field of Classification Search
  CPC ............................... H04L 69/28; H04L 69/14
  See application file for complete search history.

(56) References Cited

U.S. PATENT DOCUMENTS

| | | | |
|---|---|---|---|
| 5,561,661 A | 10/1996 | Edmaier et al. | |
| 5,809,397 A * | 9/1998 | Harthcock et al. | 455/13.2 |
| 5,822,317 A * | 10/1998 | Shibata | 370/395.62 |
| 7,558,292 B2 | 7/2009 | Gunston et al. | |
| 2003/0122705 A1* | 7/2003 | Marko et al. | 342/357.01 |
| 2005/0201399 A1* | 9/2005 | Woodward et al. | 370/412 |
| 2005/0286424 A1 | 12/2005 | Peeters et al. | |
| 2006/0203719 A1 | 9/2006 | Kim et al. | |
| 2007/0076765 A1 | 4/2007 | Gunston et al. | |
| 2009/0013330 A1 | 1/2009 | Gotz et al. | |
| 2010/0020909 A1* | 1/2010 | Jung et al. | 375/371 |
| 2011/0026410 A1* | 2/2011 | Meloche | 370/244 |

FOREIGN PATENT DOCUMENTS

| | | |
|---|---|---|
| CN | 1491000 A | 4/2004 |
| CN | 1716907 A | 1/2006 |

(Continued)

OTHER PUBLICATIONS

Written Opinion of the International Searching Authority dated Nov. 18, 2010 in connection with International Patent Application No. PCT/CN2010/075413.

She Ruiwu, et al., "Research of 1588 Time Synchronization Technology and Application Based on PTN Network", Mobile Telecommunications, vol. 2, Jan. 2009, pp. 57-62.

Supplementary European Search Report Dec. 18, 2012 in connection with European Patent Application No. EP 10 80 3890.

(Continued)

*Primary Examiner* — Joseph D Torres (57) ABSTRACT

Embodiments of the present invention relate to a message synchronization method, apparatus and system. The method includes: obtaining a first sending time stamp transmitted on a main link and a second sending time stamp transmitted on a backup link respectively; calculating to obtain a time difference according to the first sending time stamp and the second sending time stamp; adding bytes to the first message transmitted on the main link and the first message transmitted on the backup link, and form second messages to be transmitted on the main link and the backup link respectively; and sending the second messages to a receiving end on the main link and the backup link respectively.

10 Claims, 6 Drawing Sheets

(56) References Cited

FOREIGN PATENT DOCUMENTS

| | | |
|---|---|---|
| CN | 101009581 A | 8/2007 |
| CN | 101459502 A | 6/2009 |
| EP | 0 790 750 A1 | 8/1997 |
| WO | WO 2007/098775 A1 | 9/2007 |

OTHER PUBLICATIONS

International Search Report dated Nov. 18, 2010 in connection with International Patent Application No. PCT/CN2010/075413.

Search Report Nov. 26, 2012 in connection with Chinese Patent Application No. 2009100899825.

* cited by examiner

| A receiving end receives a second message transmitted on a main link, and receives a second message transmitted on a bacKup link, where the second message transmitted on the main link and the second message transmitted on the backup link both have a byte for setting a time difference, and the time difference is a difference between a second sending time stamp when a sending end sends the second message on the backup link and a first sending time stamp when the sending end sends the second message on the main link | 501 |

↓

| The receiving end obtains a first receiving time stamp when receiving the second message transmitted on the main link, and obtains a second receiving time stamp when receiving the second message transmitted on the backup link | 502 |

↓

| The receiving end performs selection on the second message transmitted on the main link and the second message transmitted on the backup link, if errors occur in the second message transmitted on the main link, selects the second message transmitted on the backup link, modifies the second receiving time stamp on the backup link according to the time difference in the second message, and removes the added byte from the selected second message to obtain a first message; and if no error occurs in the second message transmitted on the main link, selects the second message transmitted on the main link, and removes the byte set with the time difference in the second message transmitted on the main link, so as to obtain a firs message | 503 |

MESSAGE SYNCHRONIZATION METHOD, APPARATUS AND SYSTEM

CROSS-REFERENCE TO RELATED APPLICATIONS

This application is a continuation of International Application No. PCT/CN2010/075413, filed on Jul. 23, 2010, which claims priority to Chinese Patent Application No. 200910089982.5, filed on Jul. 30, 2009, both of which are hereby incorporated by reference in their entireties.

TECHNICAL FIELD

The present invention relates to the field of communications technology, and in particular, to a message synchronization method, apparatus and system.

BACKGROUND

With the development of Internet Protocol (IP) in future networks and services, various technologies of performing clock synchronization and time synchronization on the IP network are also developed rapidly. In various packet clock technologies, 1588V2 protocol of Institute of Electrical and Electronics Engineers (IEEE) has been gradually adopted in telecommunication-level communication devices due to the capability of providing time synchronization in the precision of microsecond level. The 1588V2 protocol implements time synchronization between network elements at both sides of a communication link by transferring a 1588V2 message on the single communication link, and if the communication link is interrupted, the 1588V2 protocol is switched to another normal communication link through a source selection method, so as to keep the time synchronization. However, during the switch of the communication link, a system tracking clock is lost, and therefore, a system clock is in a retention stage. In a wired connection system, such as an optical fiber system or an Ethernet cable system, the switch of a communication link will not occur frequently, and therefore, the system clock being in the retention stage for a short time does not influence recovery of time. Moreover, in the conventional wireless communication system, the protection switch of the communication link occurs frequently due to instability of a communication channel and rapid fading of the communication channel caused by multi-path interference, and therefore, through a Hitless Switch Module (HSM), data services of the communication link may ensure that the services do not have any error code and ensure that quality of service has no harm.

During the implementation of the present invention, the inventor finds that the prior art at least has the following disadvantage: sending time points of the same message on a main link and a backup link are hard to be the same in the wireless communication system, so that receiving time points of the same message are not the same.

SUMMARY

Embodiments of the present invention provide a message synchronization method, apparatus and system, which perform message synchronization processing on messages transmitted on a main link and a backup link in a wireless communication system, thereby improving message synchronization precision.

A message synchronization method provided in an embodiment of the present invention includes:
obtaining a first sending time stamp of a first message transmitted on a main link, and obtaining a second sending time stamp of a first message transmitted on a backup link;
calculating a time difference between the first sending time stamp and the second sending time stamp according to the first sending time stamp and the second sending time stamp;
adding bytes in the first message transmitted on the main link and the first message transmitted on the backup link, setting the time difference in the types, and forming a second message to be transmitted on the main link and a second message to be transmitted on the backup link respectively; and
sending the second messages to a receiving end respectively on the main link and the backup link, so that when errors occur in the second message transmitted on the main link, the receiving end selects the second message transmitted on the backup link, modifies a second receiving time stamp on the backup link according to the time difference in the second message, and removing the added byte from the selected second message to obtain the first message.

A message synchronization method provided in an embodiment of the present invention includes:
receiving a second message transmitted on a main link, and receiving a second message transmitted on a backup link, where the second message transmitted on the main link and the second message transmitted on the backup link both have a byte for setting a time difference, and the time difference is a difference between a second sending time stamp when a sending end sends the second message on the backup link and a first sending time stamp when the sending end sends the second message on the main link;
obtaining a first receiving time stamp when receiving the second message transmitted on the main link, and obtaining a second receiving time stamp when receiving the second message transmitted on the backup link; and
performing selection on the second message transmitted on the main link and the second message transmitted on the backup link, and if errors occur in the second message transmitted on the main link, selecting the second message transmitted on the backup link, modifying the second receiving time stamp on the backup link according to the time difference in the second message, and removing the added byte from the selected second message to obtain a first message.

A message synchronization apparatus provided in an embodiment of the present invention includes:
a obtaining module, configured to obtain a first sending time stamp of a first message transmitted on a main link, and obtain a second sending time stamp of a first message transmitted on a backup link;
a calculating module, configured to calculate a time difference between the first sending time stamp and the second sending time stamp according to the first sending time stamp and the second sending time stamp;
a setting module, configured to add bytes in the first message transmitted on the main link and the first message transmitted on the backup link, set the time difference in the types, and form a second message to be transmitted on the main link and a second message to be transmitted on the backup link respectively; and a sending module, configured to send the second messages to a receiving end respectively on the main link and the backup link, so that when errors occur in the second message transmitted on the main link, the receiving end selects the second message transmitted on the backup link, modifies a second receiving time stamp on the backup link according to the time difference in the second message, and removes the added byte from the selected second message to obtain the first message.

A message synchronization apparatus provided in an embodiment of the present invention includes:

a receiving module, configured to receive a second message transmitted on a main link, and receiving a second message transmitted on a backup link, where the second message transmitted on the main link and the second message transmitted on the backup link both have a byte for setting a time difference, and the time difference is a difference between a second sending time stamp when a sending end sends the second message on the backup link and a first sending time stamp when the sending end sends the second message on the main link;

an obtaining module, configured to obtain a first receiving time stamp when receiving the second message transmitted on the main link, and obtain a second receiving time stamp when receiving the second message transmitted on the backup link; and a selecting module, configured to perform selection on the second message transmitted on the main link and the second message transmitted on the backup link, and if errors occur in the second message transmitted on the main link, select the second message transmitted on the backup link, modify the second receiving time stamp on the backup link according to the time difference in the second message, and remove the added byte from the selected second message to obtain a first message.

A message synchronization system provided in an embodiment of the present invention includes a sending end and a receiving end, where the sending end is configured to obtain a first sending time stamp of a first message transmitted on a main link, and obtain a second sending time stamp of a first message transmitted on a backup link; calculate a time difference between the first sending time stamp and the second sending time stamp according to the first sending time stamp and the second sending time stamp; add bytes in the first message transmitted on the main link and the first message transmitted on the backup link, set the time difference in the bytes, and form a second message to be transmitted on the main link and a second message to be transmitted on the backup link respectively; and send the second message to the receiving end respectively on the main link and the backup link;

the receiving end is configured to receive the second message transmitted on the main link and receive the second message transmitted on the backup link, where the second message transmitted on the main link and the second message transmitted on the backup link both have a byte for setting a time difference, and the time difference is a difference between a second sending time stamp when the sending end sends the second message on the backup link and a first sending time stamp when the sending end sends the second message on the main link; obtain a first receiving time stamp when receiving the second message transmitted on the main link, and obtain a second receiving time stamp when receiving the second message transmitted on the backup link; and perform selection on the second message transmitted on the main link and the second message transmitted on the backup link, and if errors occur in the second message transmitted on the main link, select the second message transmitted on the backup link, modify the second receiving time stamp on the backup link according to the time difference in the second message, and remove the added byte from the selected second message to obtain the first message.

In the message synchronization method, apparatus and system provided in embodiments of the present invention, bytes are added in the first messages, the time difference between the first sending time stamp and the second sending time stamp is set in the bytes, and the second messages set with the bytes are transmitted on the main link and the backup link respectively. If errors occur in the second message transmitted on the main link, the second message transmitted on the backup link is selected, the second receiving time stamp on the backup link is modified according to the time difference in the second message, and the added byte is removed from the selected second message to obtain the first message, thereby achieving the synchronization process of the message. Moreover, the time difference is the difference between the first sending time stamp and the second sending time stamp, the difference precisely obtains the difference between time points when sending the message, and therefore, the precision of message synchronization is improved through the time difference.

BRIEF DESCRIPTION OF THE DRAWINGS

In order to clearly describe the technical solutions of the present invention or the prior art, the accompanying drawings used in the description of the embodiment or the prior art are briefly introduced. It is obvious that the accompanying drawings to be described are only a part rather than all of the embodiments of the present invention. Other accompanying drawings may be obtained by those skilled in the art based on the accompanying drawings without carrying out creative activities.

DETAILED DESCRIPTION

The technical solution of the present invention is hereunder described in detail with reference to the accompanying drawings. It is evident that the embodiments are only some exemplary embodiments of the present invention, and the present invention is not limited to such embodiments. Other embodiments that those skilled in the art obtain based on embodiments of the present invention without carrying out creative activities also all within the protection scope of the present invention.

During protection shift of HSM, the two links, namely, the main link and the backup link, respectively obtain two data streams after correction and uncorrectable indication through Forward Error Correction (Forward Error Correction, FEC for short). Interference on the main link and interference on the backup link do not occur at the same time, and therefore, the same section of data has different correction degrees on the main link and the backup link. Specifically, at a certain time point, the data on the main link is exactly correct, but the data on the backup link is uncorrectable; or, the data on the main link is uncorrectable, but the data on the backup link is exactly correct. The probability of the case that the same section of data has errors on the main link and the backup link at the same time is very small, so the HSM performs alternative selection according to correction situation of each section of data, thereby improving service quality of the whole communication link. Moreover, the main link and the backup link has different delays, so before performing the alternative selection, the HSM may perform delay compensation through First In First Out (First In First Out, FIFO for short) to align a delay difference between the main link and the backup link, and data after the alignment is selected according to the HSM.

Figure 1:
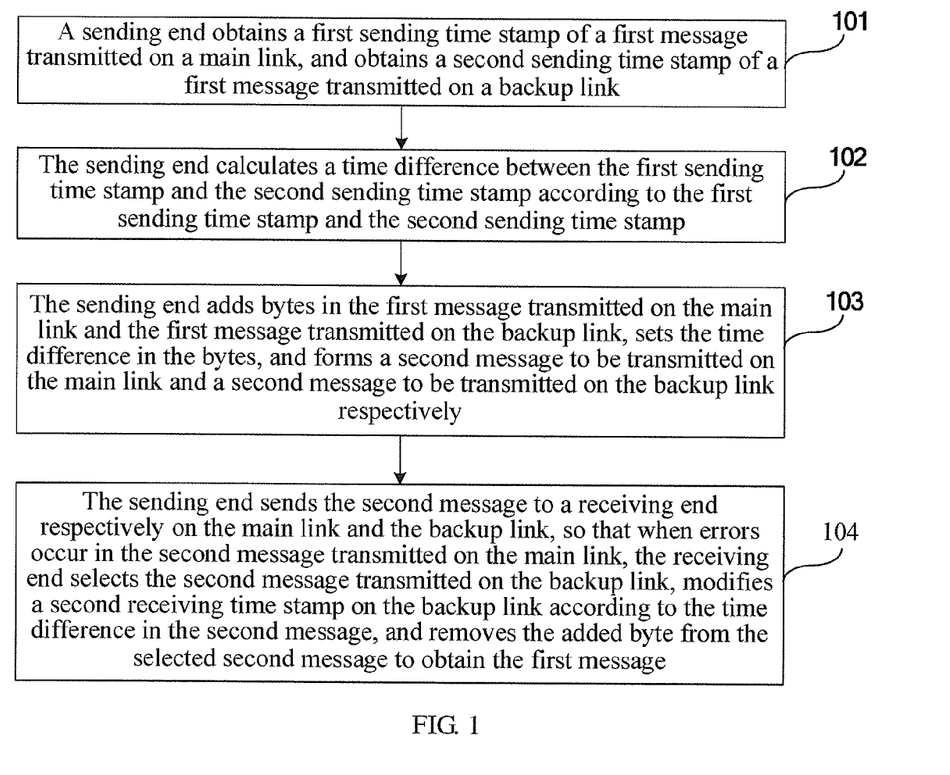
FIG. 1 is a schematic flowchart of an embodiment of a message synchronization method of the present invention.

FIG. 1 is a schematic flowchart of an embodiment of a message synchronization method of the present invention. As shown in FIG. 1, this embodiment includes the following steps:

Step 101: A sending end obtains a first sending time stamp of a first message transmitted on a main link, and obtains a second sending time stamp of a first message transmitted on a backup link;

Step 102: The sending end calculates a time difference between the first sending time stamp and the second sending time stamp according to the first sending time stamp and the second sending time stamp;

Step 103: The sending end adds bytes in the first message transmitted on the main link and the first message transmitted on the backup link, sets the time difference in the bytes, and forms a second message to be transmitted on the main link and a second message to be transmitted on the backup link respectively; and Step 104: The sending end sends the second messages to a receiving end respectively on the main link and the backup link, so that when errors occur in the second message transmitted on the main link, the receiving end selects the second message transmitted on the backup link, modifies a second receiving time stamp on the backup link according to the time difference in the second message, and removes the added byte from the selected second message to obtain the first message.

The first message in the embodiment of the present invention may specifically be an original 1588V2 message.

In the message synchronization method provided in embodiments of the present invention, bytes are added in the first messages, and the time difference between the first sending time stamp and the second sending time stamp is set in the bytes. When errors occur in the second message transmitted on the main link, the receiving end selects the second message transmitted on the backup link, modifies the second receiving time stamp on the backup link according to the time difference in the second message, and removes the added byte from the selected second message transmitted on the backup link to obtain the first message, thereby achieving the synchronization process of the messages. Moreover, the time difference is the difference between the first sending time stamp and the second sending time stamp, the difference precisely obtains the difference between time points when sending the message, and therefore, the precision of message synchronization is improved through the time difference.

Figure 2:
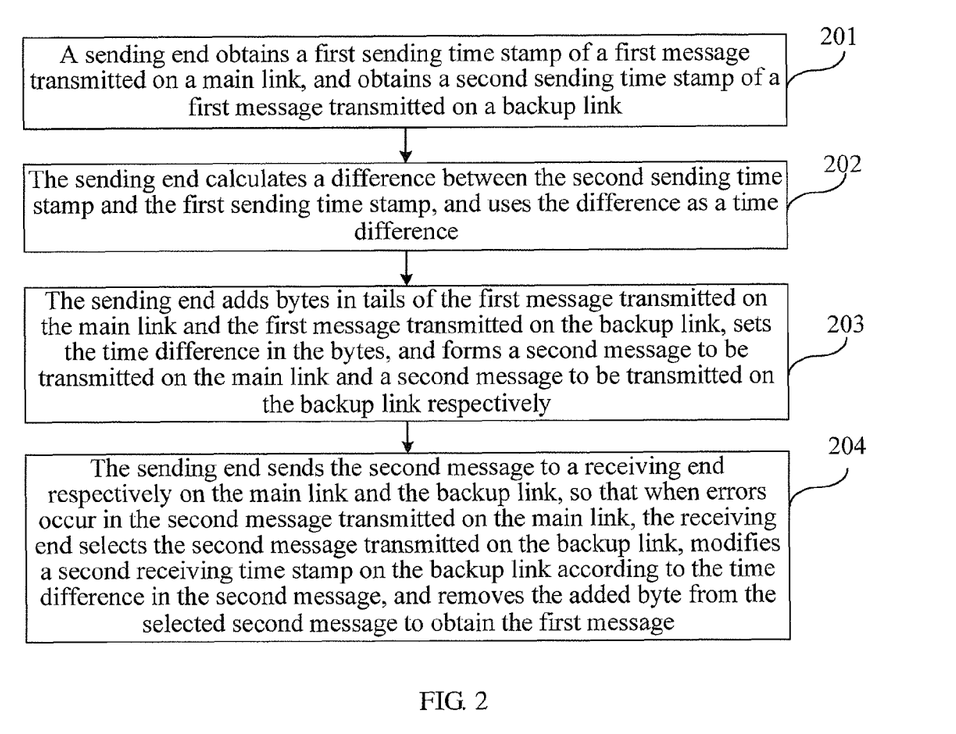
FIG. 2 is a schematic flow chart of another embodiment of a message synchronization method of the present invention.
Figure 3:
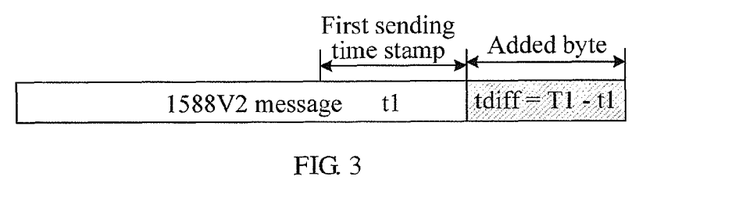
FIG. 3 is a schematic structural diagram of a second message formed by adding a byte in the embodiment shown in FIG. 2.

FIG. 2 is a schematic flow chart of another embodiment of a message synchronization method of the present invention, and FIG. 3 is a schematic structural diagram of a second message formed by adding a byte in the embodiment shown in FIG. 2. As shown in FIG. 2, this embodiment includes the following steps:

Step 201: A sending end obtains a first sending time stamp of a first message transmitted on a main link, and obtains a second sending time stamp of a first message transmitted on a backup link;

Step 202: The sending end calculates a difference between the second sending time stamp and the first sending time stamp, and uses the difference as a time difference;

Step 203: The sending end adds bytes in tails of the first message transmitted on the main link and the first message transmitted on the backup link, sets the time difference in the bytes, and forms a second message to be transmitted on the main link and a second message to be transmitted on the backup link respectively; and Step 204: The sending end sends the second messages to a receiving end respectively on the main link and the backup link, so that when errors occur in the second message transmitted on the main link, the receiving end selects the second message transmitted on the backup link, modifies a second receiving time stamp on the backup link according to the time difference in the second message, and removes the added byte from the selected second message to obtain the first message.

In step 201, the first message may be an original 1588V2 message. Specifically, when transmitting the 1588V2 message on the main link and the backup link, sending time stamps when sending the 1588V2 message on the main link and the backup link are obtained respectively, that is, a first sending time stamp t1 on the main link and a second sending time stamp T1 on the backup link. Specifically, the sending time stamps when sending the 1588V2 message on the main link and the backup link may be recorded respectively, so as to obtain the first sending time stamp t1 on the main link and the second sending time stamp T1 on the backup link.

In step 202, the sending end calculates a difference tdiff=T1−t1 between the second sending time stamp T1 and the first sending time stamp t1 through the obtained first sending time stamp t1 and the second sending time stamp T1, and uses the difference as the time difference. Moreover, the 1588V2 message transmitted on the backup link is forwarded through the main link, so the second sending time stamp T1 obtained when sending the 1588V2 message on the backup link has a delay as compared with the first sending time stamp t1 obtained when sending the 1588V2 message on the main link, that is, the second sending time stamp T1 is greater than the first sending time stamp t1, and therefore, the time difference tdiff=T1−t1 obtained through the first sending time stamp t1 and the second sending time stamp T1 is a positive value. Definitely, a time difference being a negative value may also be obtained through tdiff=t1−T1.

In step 203, the second message may be a 1588V2 message having a byte added in the tail. Specifically, when obtaining the first sending time stamp, the 1588V2 message only has a message header sent out, and a tail of the 1588V2 message still waits for being sent, and therefore, the sending end uses the first sending time stamp t1 of the main link as a sending time point of an event message, and adds a byte in the tail of the original 1588V2 message. As shown in FIG. 3, the first sending time stamp t1 has been set in the original 1588V2 message. By adding the byte for setting the time difference in the tail of the original 1588V2 message, the receiving end is capable of obtaining the time difference tdiff by directly extracting tail information of the 1588V2 message after receiving the 1588V2 message having the byte added in the tail through the main link and the backup link.

In step 204, the 1588V2 message having the time difference tdiff set is sent to the receiving end respectively through the main link and the backup link, when the main link fails so that errors occur in the 1588V2 message transmitted on the main link, by making the 1588V2 message transmitted on the backup link being the same as the 1588V2 message transmitted on the main link, the receiving end may still receive, through the backup link, the 1588V2 message having the content the same as that of the 1588V2 message transmitted on the main link. The 1588V2 message carries the first sending time stamp t1 on the main link, after the time difference tdiff is set in the tail of the 1588V2 message, if errors occur in the 1588V2 message and are uncorrectable, the receiving end receives the 1588V2 message having added byte in the tail through the backup link. A second receiving time stamp T2 when the receiving end receives the message on the backup link and a first receiving time stamp t2 when the receiving end receives the message on the main link have a relational expression: T2−t2=tdiff, and therefore, the receiving end may implement synchronization of the message transmitted on the backup link and the message transmitted on the main link through the time difference. Moreover, the time difference is the difference between the first sending time stamp t1 and the second sending time stamp T1, the difference precisely obtains the difference of time points when sending the message, and therefore, the precision of message synchronization is improved through the time difference tdiff.

In the message synchronization method provided in the embodiment of the present invention, bytes are added in the tails of the first messages, the time difference between the first sending time stamp and the second sending time stamp is set in the bytes, and the second messages having the bytes set are transmitted on the main link and the backup link respectively. If errors occur in the message on the main link and are uncorrectable, the receiving end may adjust the second receiving time stamp when receiving the message on the backup link according to the time difference, so as to obtain the receiving time stamp the same as the first receiving time stamp when receiving the message on the main link, thereby achieving the synchronization of the message transmitted on the backup link and the message transmitted on the main link. The time difference is the difference between the first sending time stamp t1 and the second sending time stamp T1, the difference precisely obtains the difference of time points when sending the message, and therefore, the precision of message synchronization is improved through the time difference tdiff.

Figure 4:
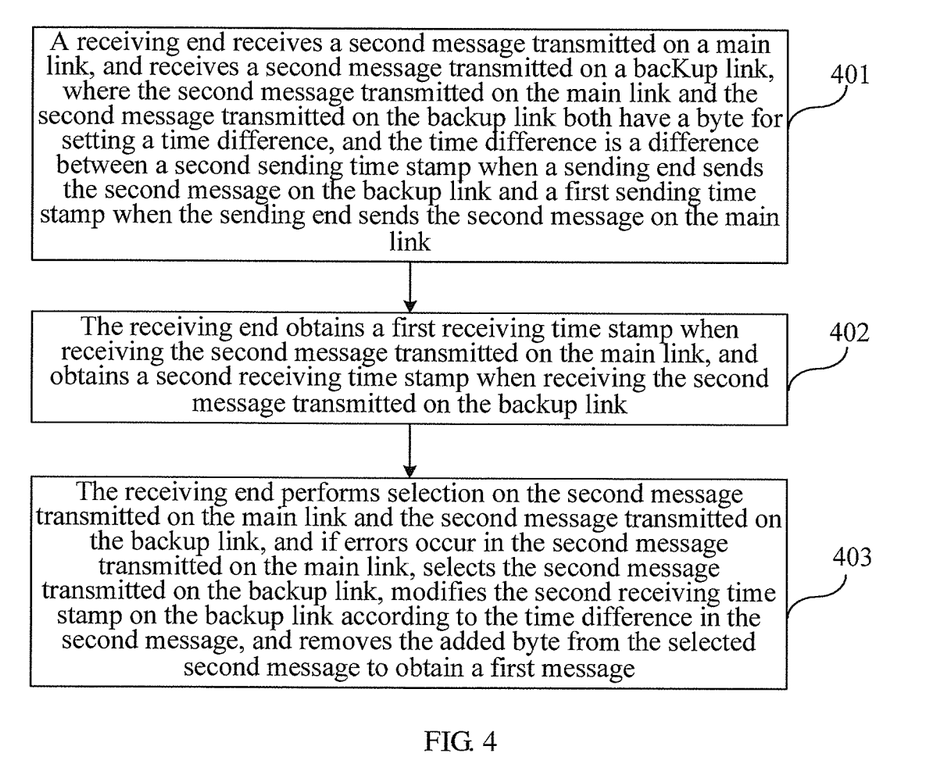
FIG. 4 is a schematic flow chart of still another embodiment of a message synchronization method of the present invention.

FIG. 4 is a schematic flow chart of still another embodiment of a message synchronization method of the present invention. As shown in FIG. 4, this embodiment includes the following steps:

Step 401: A receiving end receives a second message transmitted on a main link, and receives a second message transmitted on a backup link, where the second message transmitted on the main link and the second message transmitted on the backup link both have a byte for setting a time difference, and the time difference is a difference between a second sending time stamp when a sending end sends the second message on the backup link and a first sending time stamp when the sending end sends the second message on the main link;

Step 402: The receiving end obtains a first receiving time stamp when receiving the second message transmitted on the main link, and obtains a second receiving time stamp when, receiving the second message transmitted on the backup link; and Step 403: The receiving end performs selection on the second message transmitted on the main link and the second message transmitted on the backup link, and if errors occur in the second message transmitted on the main link, selects the second message transmitted on the backup link, modifies the second receiving time stamp on the backup link according to the time difference in the second message, and removes the added byte from the selected second message to obtain a first message.

In the message synchronization method provided in the embodiment of the present invention, the receiving end obtains the first receiving time stamp when receiving the second message transmitted on the main link, and obtains the second receiving time stamp when receiving the second message transmitted on the backup link. If errors occur in the message on the main link and are uncorrectable, the receiving end selects the second message transmitted on the backup link, modifies the second receiving time stamp on the backup link according to the time difference in the second message, so that the receiving end may obtain the same receiving time stamp on the main link and the backup link, thereby achieving the synchronization of the messages. The time difference is the difference between the first sending time stamp and the second sending time stamp, the difference precisely obtains the difference of time points when sending the message, and therefore, the precision of message synchronization is improved through the time difference.

Figure 5:
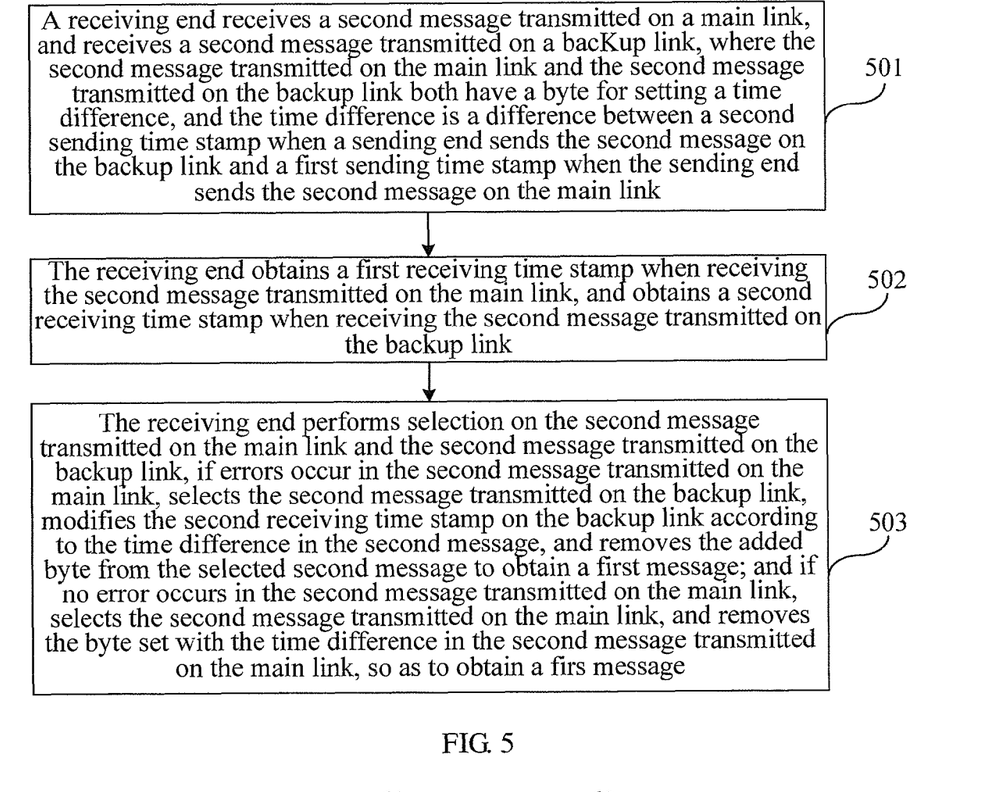
FIG. 5 is a schematic flow chart of yet another embodiment of a message synchronization method of the present invention.

FIG. 5 is a schematic flow chart of yet another embodiment of a message synchronization method of the present invention. As shown in FIG. 5, this embodiment includes the following steps:

Step 501: A receiving end receives a second message transmitted on a main link, and receives a second message transmitted on a backup link, where the second message transmitted on the main link and the second message transmitted on the backup link both have a byte for setting a time difference, and the time difference is a difference between a second sending time stamp when a sending end sends the second message on the backup link and a first sending time stamp when the sending end sends the second message on the main link;

Step 502: The receiving end obtains a first receiving time stamp when receiving the second message transmitted on the main link, and obtains a second receiving time stamp when receiving the second message transmitted on the backup link; and Step 503: The receiving end performs selection on the second message transmitted on the main link and the second message transmitted on the backup link, if errors occur in the second message transmitted on the main link, selects the second message transmitted on the backup link, modifies the second receiving time stamp on the backup link according to the time difference in the second message, and removes the added byte from the selected second message to obtain a first message; and if no error occurs in the second message transmitted on the main link, selects the second message transmitted on the main link, and removes the byte set with the time difference in the second message transmitted on the main link, so as to obtain a first message.

In step 501, the second message may be a 1588V2 message having a byte for setting the time difference in a tail thereof and sent by the sending end, and the time difference tdiff is a difference between a second sending time stamp T1 when the sending end sends the second message on the backup link and a first sending time stamp t1 when the sending end sends the second message on the main link.

In step 502, the receiving end obtains the receiving time stamp, that is, a first receiving time stamp t2, when receiving the 1588V2 message transmitted on the main link, and the receiving end obtains the receiving time stamp, that is, a second receiving time stamp T2, when receiving the 1588V2 message transmitted on the backup link. Specifically, the receiving time stamps when the 1588V2 message is received on the main link and the backup link may be recorded respectively, so as to obtain the first receiving time stamp t2 on the main link and the second receiving time stamp T2 on the backup link.

In step 503, when the receiving end performs non-error selection on the second messages transmitted on the main link and the backup link, if the receiving end selects the 1588V2 message transmitted on the main link, the first receiving time stamp t2 is used as a synchronization time stamp, the byte having the time difference set in the second message transmitted on the main link is removed, so as to obtain the first message. When the main link fails, so that errors occur in the 1588V2 message transmitted on the main link and are uncorrectable, the receiving end selects the 1588V2 message transmitted on the backup link. The first receiving time stamp t2 and the second receiving time stamp T2 have the following relationship: t2=T2−tdiff, and therefore, when it is selected to use the 1588V2 message transmitted on the backup link as the received message, by modifying the second receiving time stamp T2, a synchronization time stamp, that is, the first receiving time stamp t2, the same as that of the 1588V2 message transmitted on the main link is obtain, thereby achieving the synchronization of messages on the main link and the backup link. The second message is formed by adding the byte in the tail of the original 1588V2 message by the sending end, so after the receiving end obtains the time difference tdiff in the byte set in the tail of the 1588V2 message, the receiving end removes the byte to obtain the original 1588V2 message.

In the message synchronization method provided in the embodiment of the present invention, the receiving end obtains the first receiving time stamp when receiving the second message transmitted on the main link, and obtains the second receiving time stamp when receiving the second message transmitted on the backup link. If the second message transmitted on the main link is selected, the first receiving time stamp is used as the synchronization time stamp, and if errors occur in the message on the main link and are uncorrectable, the receiving end selects the second message transmitted on the backup link, modifies the second receiving time stamp according to the time difference to obtain the synchronization time stamp, thereby achieving the synchronization of the message transmitted on the backup link and the message transmitted on the main link. The time difference is the difference between the first sending time stamp t1 and the second sending time stamp T1, the difference precisely obtains the difference of time points when sending the message, and therefore, the precision of message synchronization is improved through the time difference tdiff.

Figure 6:
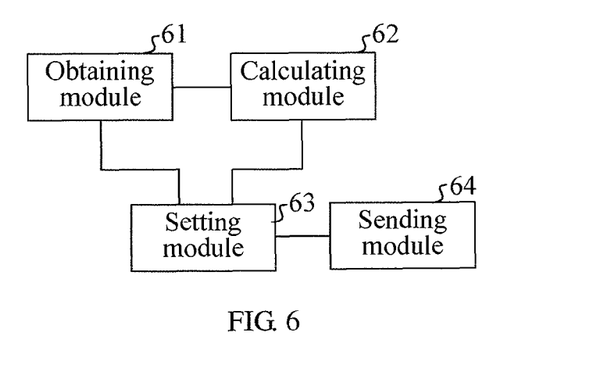
FIG. 6 is a schematic structural diagram of an embodiment of a message synchronization apparatus of the present invention.

FIG. 6 is a schematic structural diagram of an embodiment of a message synchronization apparatus of the present invention. As shown in FIG. 6, this embodiment includes: an obtaining module 61, a calculating module 62, a setting module 63, and a sending module 64.

The obtaining module 61 obtains a first sending time stamp of a first message transmitted on a main link, and obtains a second sending time stamp of a first message transmitted on a backup link. The calculating module 62 calculates a time difference between the first sending time stamp and the second sending time stamp according to the first sending time stamp and the second sending time stamp obtained by the obtaining module 61. The setting module 63 adds bytes in the first message transmitted on the main link and the message transmitted on the backup link, sets the time difference calculated by the calculating module 62 in the bytes, and forms a second message to be transmitted on the main link and a second message to be transmitted on the backup link. The sending module 64 sends the second messages to a receiving end respectively on the main link and the backup link, so that when errors occur in the second message transmitted on the main link, the receiving end selects the second message transmitted on the backup link, modifies a second receiving time stamp on the backup link according to the time difference in the second message, and removes the added byte from the selected second message, so as to obtain the first message.

In the embodiment of the present invention, the first message is specifically an original 1588V2 message, and the second message may correspondingly be a message having a byte added in the tail of the original 1588V2 message.

In the message synchronization apparatus provided in the embodiment of the present invention, the setting module 63 adds a byte in the first message, and sets the time difference between the first sending time stamp and the second sending time stamp in the byte. The second message set with the byte is transmitted respectively on the main link and the backup link, so the receiving end receiving the second message modifies the second receiving time stamp on the backup link according to the time difference in the second message. When the main link fails, so that errors occur in the second message transmitted on the main link and are uncorrectable, the receiving end receives the second message through the backup link, and modifies the second receiving time stamp on the backup link according to the time difference in the second message, so that the receiving end may obtain the same receiving time stamp on the main link and the backup link, thereby implementing the synchronization processing of messages. Moreover, the time difference is the difference between the first sending time stamp and the second sending time stamp, the difference precisely obtains the difference of time points when sending the message, and therefore, the precision of message synchronization is improved through the time difference.

Further, based on the embodiment shown in FIG. 6, the calculating module 62 may further include: a difference calculating unit. The difference calculating unit calculates to obtain the difference between the first sending time stamp and the second sending time stamp, and uses the difference as the time difference.

Further, based on the embodiment shown in FIG. 6, the setting module 63 may further include: an adding unit and a setting unit. The adding unit adds fields to form bytes in the tails of the first message transmitted on the main link and the first message transmitted on the backup. The setting unit sets the time difference in the bytes, and forms a second message to be transmitted on the main link and a second message to be transmitted on the backup link respectively. The time difference is set in the tail of the second message, so that after receiving the second message, the receiving end may obtain the time difference through directly extracting tail information of the message.

Figure 7:
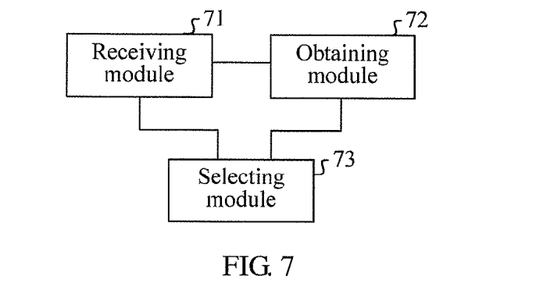
FIG. 7 is a schematic structural diagram of another embodiment of a message synchronization apparatus of the present invention.

FIG. 7 is a schematic structural diagram of another embodiment of a message synchronization apparatus of the present invention. As shown in FIG. 7, this embodiment includes: a receiving module 71, an obtaining module 72, and a selecting module 73.

The receiving module 71 receives a second message transmitted on a main link and receives a second message transmitted on a backup link, where the second message transmitted on the main link and the second message transmitted on the backup link both have a byte for setting a time difference, and the time difference is a difference between a second sending time stamp when a sending end sends the second message on the backup link and a first sending time stamp when the sending end sends the second message on the main link. The obtaining module 72 obtains a first receiving time stamp when the receiving module 71 receives the second message transmitted on the main link, and obtains a second receiving time stamp when the receiving module 71 receives the second message transmitted on the backup link. The selecting module 73 performs selection on the second message transmitted on the main link and the second message transmitted on the backup link which are received by the receiving module 71, and if errors occur in the second message transmitted on the main link, selects the second message transmitted on the backup link, modifies the second receiving time stamp on the backup link and obtained by the obtaining module 72 according to the time difference in the second message, and removes an added byte from the selected second message to obtain a first message.

In the embodiment of the present invention, the first message is specifically a 1588V2 message, and the second message may correspondingly be a message having a byte added in the tail of the 1588V2 message.

In the message synchronization apparatus provided in the embodiment of the present invention, the obtaining module 72 obtains the first receiving time stamp when receiving the second message transmitted on the main link, and obtains the second receiving time stamp when receiving the second message transmitted on the backup link. If the main link fails, so that errors occur in the message on the main link and are uncorrectable, the selecting module 73 selects the second message transmitted on the backup link, modifies the second receiving time stamp on the backup link according to the time difference in the second message, so that the receiving end may obtain the same receiving time stamp on the main link and the backup link, thereby achieving the synchronization of the messages. The time difference is the difference between the first sending time stamp and the second sending time stamp, the difference precisely obtains the difference of time points when sending the message, and therefore, the precision of message synchronization is improved through the time difference.

Figure 8:
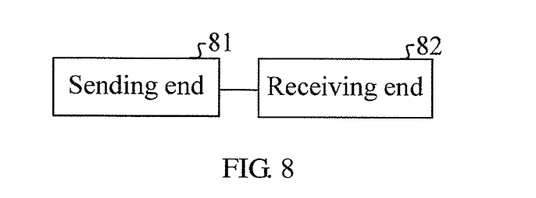
FIG. 8 is a schematic structural diagram of an embodiment of a message synchronization system of the present invention.

FIG. 8 is a schematic structural diagram of an embodiment of a message synchronization system of the present invention. As shown in FIG. 8, this embodiment includes: a sending end 81 and a receiving end 82.

The sending end 81 obtains a first sending time stamp of a first message transmitted on a main link, and obtains a second sending time stamp of a first message transmitted on a backup link; calculates a time difference between the first sending time stamp and the second sending time stamp according to the first sending time stamp and the second sending time stamp; adds bytes in the first message transmitted on the main link and the first message transmitted on the backup link, sets the time difference in the bytes, and forms a second message to be transmitted on the main link and a second message to be transmitted on the backup link respectively; and sends the second message to the receiving end 82 respectively on the main link and the backup link.

The receiving end 82 receives the second message transmitted on the main link from the sending end 81, and receives the second message transmitted on the backup link from the sending end 81; obtains a first receiving time stamp of the second message transmitted on the main link, and obtains a second receiving time stamp of the second message transmitted on the backup link; performs selection on the second message transmitted on the main link and the second message transmitted on the backup link, if errors occur in the second message transmitted on the main link, selects the second message transmitted on the backup link, modifies the second receiving time stamp on the backup link according to the time difference in the second message, and removes the added byte from the selected second message to obtain the first message.

In the embodiment of the present invention, the first message is specifically a 1588V2 message, and the second message may correspondingly be a message having a byte added in the tail of the 1588V2 message.

In the message synchronization system provided in the embodiment of the present invention, the sending module 81 adds a byte in the first message, and sets the time difference between the first sending time stamp and the second sending time stamp in the type. The second message set with the byte is transmitted respectively on the main link and the backup link, so the receiving end 82 receiving the second message is capable of obtaining the second sending time stamp on the backup link according to the time difference in the second message. When errors occur in the second message on the main link and are uncorrectable, the receiving end 82 receives the second message on the backup link, modifies the second receiving time stamp on the backup link according to the time difference in the second message, so that the receiving end 82 may obtain the same receiving time stamp on the main link and the backup link, thereby implementing the synchronization processing of messages. Moreover, the time difference is the difference between the first sending time stamp and the second sending time stamp, the difference precisely obtains the difference of time points when sending the message, and therefore, the precision of message synchronization is improved through the time difference.

Based on the embodiment shown in FIG. 8, if no error occurs in the second message transmitted on the main link, the receiving end 82 selects the second message transmitted on the main link, removes the byte set with the time difference from the second message transmitted on the main link, so as to obtain the first message.

Figure 9:
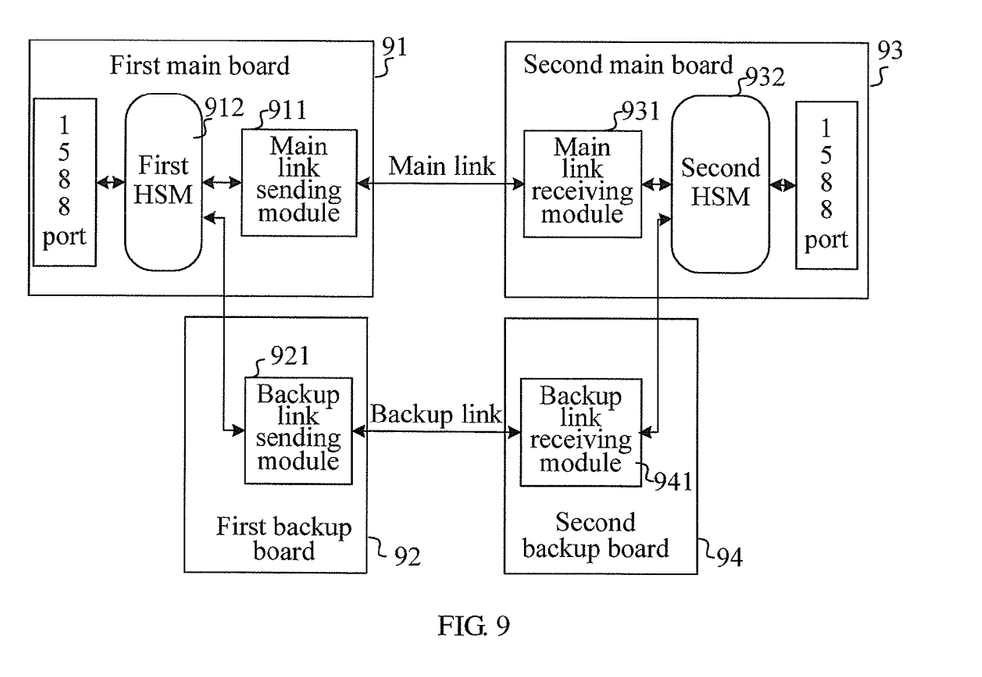
FIG. 9 is a schematic structural diagram of another embodiment of a message synchronization system of the present invention.
Figure 10:
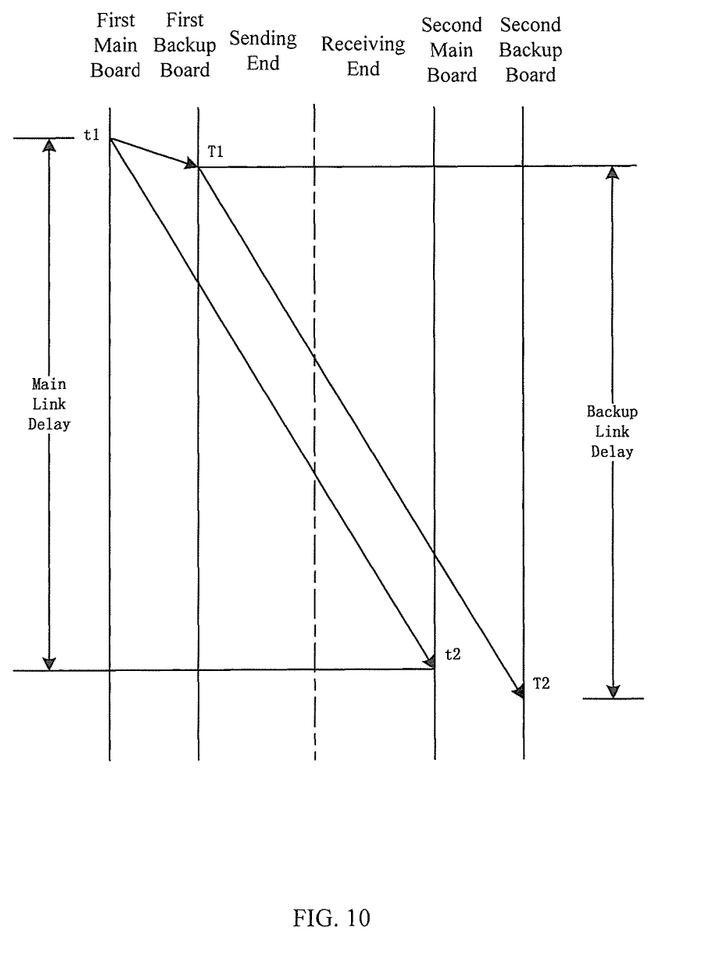
FIG. 10 is a schematic diagram of time stamp relationship in the embodiment shown in FIG. 9.

FIG. 9 is a schematic structural diagram of an application embodiment of a message synchronization system of the present invention, and FIG. 10 is a schematic diagram of time stamp relationship in the embodiment shown in FIG. 9. This embodiment is illustrated in detail by taking a 1588V2 message as an example.

As shown in FIG. 9, in the message synchronization system, a receiving end and a sending end are respectively located at two sides of a main link and a backup link. The sending end is formed by a first main board 91 and a first backup board 92, and the receiving end is formed by a second main board 93 and a second backup board 94. In the sending end, the first main board 91 obtains a first sending time stamp t1 through a main link sending module 911, the first backup board 92 obtains a second sending time stamp T1 through a backup link sending module 921. The first sending time stamp t1 is set in the 1588V2 message as a sending time stamp of the 1588V2 message at the sending end, and a time difference tdiff=T1=t1 between the main link and the backup link is set in a byte newly added in the tail of the 1588V2 message. The 1588V2 message set with the time difference is sent to the receiving end by the main link sending module 911 of the first main board 91 and the backup link sending module 921 of the first spare board 92 on the main link and the backup link respectively.

In the receiving end, a main link receiving module 931 on the second main board 93 receives the 1588V2 message set with the time difference and transmitted on the main link, and a backup link receiving module 941 on the second backup board 94 receives the 1588V2 message set with the time difference and transmitted on the backup link. The second backup board 94 sends the 1588V2 message set with the time difference and received by the backup link receiving module 941 to the second main board 93, a second HSM 932 on the second main board 93 performs alternative selection on the 1588V2 messages set with the time difference and received from the main link receiving module 931 and the backup link receiving module 941 according to the message error situation, and after completing the selection, sends the selected 1588V2 message set with the time difference and received by the main link receiving module 931 or received by the backup link receiving module 941 to a 1588 port to process the 1588V2 message.

As shown in FIG. 10, the first main board 91 obtains the sending time stamp t1 through the main link sending module 911, and the first backup board 92 obtains the second sending time stamp T1 through the backup link sending module 921. The 1588 port of the sending end uses the first sending time stamp t1 transmitted on the main link as the sending time stamp of the 1588V2 message of the sending end, and sets a time difference tdiff=T1−t1 between the main link and the backup link in a byte newly added in the tail of the 1588V2 message. After the 1588V2 message is transmitted through the main link and the backup link and arrives the receiving end, the second main board 93 obtains a first receiving time stamp t2 through the main link receiving module 931, and the second backup board 94 obtains a second receiving time stamp T2 through the backup link receiving module 941. The main link has a delay being t2−t1, and the backup link has a delay being T2−T1. The transmission delays of the 1588V2 message on the main link and the backup link are the same, and therefore, t2−t1=T2−T1, thereby T1−t1=T2−t2, that is, tdiff=T2−t2. Accordingly, the second receiving time stamp T2 transmitted on the backup link may be modified at the receiving end, and the modified receiving time stamp on the second backup board 84 after modification is T2−tdiff. When the main link fails, so that errors occur in the 1588V2 message transmitted on the main link and are uncorrectable, due to the relationship of the first receiving time stamp t2 and the second receiving time stamp T2 being t2=T2−tdiff, when the 1588V2 message transmitted on the backup link is selected as the received message, by modifying the second receiving time stamp T2, the modified receiving time stamp T2 the same as the received first receiving time stamp t2 of the 1588V2 message transmitted on the main link is obtained, thereby implementing the synchronization of the messages on the main link and the backup link. Moreover, the time difference tdiff is the difference between the first sending time stamp t1 and the second sending time stamp T1, the difference precisely obtains the difference of time points when sending the message, and therefore, the precision of message synchronization is improved through the time difference tdiff.

In the embodiment of the present invention, the 1588V2 message is taken as an example, but this method is not limited to the 1588V2 message, and messages capable of being synchronization by passing through this method all fall within the protection scope of the present invention.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A message synchronization method, comprising:
   obtaining a first sending time stamp of a first message transmitted on a main link, and obtaining a second sending time stamp of a first message transmitted on a backup link;
   calculating a time difference between the first sending time stamp and the second sending time stamp according to the first sending time stamp and the second sending time stamp;
   adding bytes in the first message transmitted on the main link and the first message transmitted on the backup link, setting the time difference in the types, and forming a second message to be transmitted on the main link and a second message to be transmitted on the backup link respectively; and
   sending the second messages to a receiving end respectively on the main link and the backup link, so that when errors occur in the second message transmitted on the main link, the receiving end modifies a second receiving time stamp on the backup link according to the time difference in the second message transmitted on the backup link, and removes the added byte to obtain the first message.

2. The method according to claim 1, wherein the first message is a 1588V2 message.

3. The method according to claim 1, wherein the calculating the time difference between the first sending time stamp and the second sending time stamp according to the first sending time stamp and the second sending time stamp comprises:
   calculating a difference between the first sending time stamp and the second sending time stamp, and using the difference as the time difference.

4. The method according to claim 1, wherein the sending the second message to the receiving end respectively on the main link and the backup link, so that when errors occur in the second message transmitted on the main link, the receiving end modifies the second receiving time stamp on the backup link according to the time difference in the second message transmitted on the backup link, and removes the added byte to obtain the first message comprises:

adding fields to form the bytes in tails of the first message transmitted on the main link and the first message transmitted on the backup link, setting the time difference in the bytes, and forming the second message to be transmitted on the main link and the second message to be transmitted on the backup link respectively.

5. A message synchronization method, comprising:
receiving a second message transmitted on a main link, and receiving a second message transmitted on a backup link, wherein the second message transmitted on the main link and the second message transmitted on the backup link both have a byte for setting a time difference, and the time difference is a difference between a second sending time stamp when a sending end sends the second message on the backup link and a first sending time stamp when the sending end sends the second message on the main link;
obtaining a first receiving time stamp when receiving the second message transmitted on the main link, and obtaining a second receiving time stamp when receiving the second message transmitted on the backup link; and
performing selection on the second message transmitted on the main link and the second message transmitted on the backup link, and if errors occur in the second message transmitted on the main link, selecting the second message transmitted on the backup link, modifying the second receiving time stamp on the backup link according to the time difference in the second message, and removing the added byte set with the time difference from the selected second message to obtain a first message.

6. The method according to claim 5, further comprising:
if no error occurs in the second message transmitted on the main link, selecting the second message transmitted on the main link, removing the byte set with the time difference from the second message transmitted on the main link, so as to obtain the first message.

7. A message synchronization apparatus, comprising:
a obtaining module, configured to obtain a first sending time stamp of a first message transmitted on a main link, and obtain a second sending time stamp of a first message transmitted on a backup link;
a calculating module, configured to calculate a time difference between the first sending time stamp and the second sending time stamp according to the first sending time stamp and the second sending time stamp;
a setting module, configured to add bytes in the first message transmitted on the main link and the first message transmitted on the backup link, set the time difference in the bytes, and form a second message to be transmitted on the main link and a second message to be transmitted on the backup link respectively; and
a sending module, configured to send the second messages to a receiving end respectively on the main link and the backup link, so that when errors occur in the second message transmitted on the main link, the receiving end selects the second message transmitted on the backup link, modifies a second receiving time stamp on the backup link according to the time difference in the second message, and removes the added byte from the selected second message to obtain the first message.

8. The apparatus according to claim 7, wherein the setting module comprises:

an adding unit, configured to add fields to form the bytes in tails of the first message transmitted on the main link and the first message transmitted on the backup link; and
a setting unit, configured to set the time difference in the bytes, and form the second message to be transmitted on the main link and the second message to be transmitted on the backup link respectively.

9. A message synchronization apparatus, comprising:
a receiving module, configured to receive a second message transmitted on a main link, and receive a second message transmitted on a backup link, wherein the second message transmitted on the main link and the second message transmitted on the backup link both have a byte for setting a time difference, and the time difference is a difference between a second sending time stamp when a sending end sends the second message on the backup link and a first sending time stamp when the sending end sends the second message on the main link;
an obtaining module, configured to obtain a first receiving time stamp when receiving the second message transmitted on the main link, and obtain a second receiving time stamp when receiving the second message transmitted on the backup link; and
a selecting module, configured to perform selection on the second message transmitted on the main link and the second message transmitted on the backup link, and if errors occur in the second message transmitted on the main link, select the second message transmitted on the backup link, modify the second receiving time stamp on the backup link according to the time difference in the second message, and remove the added byte from the selected second message to obtain a first message.

10. A message synchronization system, comprising: a sending end and a receiving end, wherein
the sending end is configured to obtain a first sending time stamp of a first message transmitted on a main link, and obtain a second sending time stamp of a first message transmitted on a backup link; calculate a time difference between the first sending time stamp and the second sending time stamp according to the first sending time stamp and the second sending time stamp; add bytes in the first message transmitted on the main link and the first message transmitted on the backup link, set the time difference in the bytes, and form a second message to be transmitted on the main link and a second message to be transmitted on the backup link respectively; and send the second messages to the receiving end respectively on the main link and the backup link; and
the receiving end is configured to receive the second message transmitted on the main link, and receive the second message transmitted on the backup link; obtain a first receiving time stamp of the second message transmitted on the main link, and obtain a second receiving time stamp of the second message transmitted on the backup link; perform selection on the second message transmitted on the main link and the second message transmitted on the backup link, if errors occur in the second message transmitted on the main link, select the second message transmitted on the backup link, modify the second receiving time stamp on the backup link according to the time difference in the second message, and remove the added byte from the selected second message to obtain the first message.

* * * * *